US006608997B1

(12) United States Patent
Fischer et al.

(10) Patent No.: US 6,608,997 B1
(45) Date of Patent: Aug. 19, 2003

(54) METHOD AND APPARATUS FOR VARYING THE POWER LEVEL OF A TRANSMITTED SIGNAL

(75) Inventors: Eugene Fischer, Clermont, FL (US); Steven K. Latham, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/227,833

(22) Filed: Jan. 11, 1999

Related U.S. Application Data

(63) Continuation-in-part of application No. 09/185,579, filed on Nov. 4, 1998.

(51) Int. Cl.[7] ................................................ H04B 1/04

(52) U.S. Cl. ........................................ 455/127; 455/115

(58) Field of Search ............................ 455/73, 90, 348, 455/126, 127, 572, 115; 323/273, 280, 271; 363/21, 97

(56) References Cited

U.S. PATENT DOCUMENTS 4,667,144 A * 5/1987 Jones et al. ................. 323/271
5,455,503 A * 10/1995 Kohler ....................... 323/273
5,559,471 A * 9/1996 Black ......................... 455/127
5,613,229 A * 3/1997 Baranowski et al. ........ 455/127
5,764,501 A * 6/1998 Limpaecher ................. 363/61
5,826,170 A * 10/1998 Hirschfield et al. ......... 455/127
5,999,829 A * 12/1999 Chun ......................... 455/572
6,026,284 A * 2/2000 Seo ............................ 455/115
6,089,456 A * 7/2000 Walsh et al. ........... 235/472.01

* cited by examiner

*Primary Examiner*—William Trost
*Assistant Examiner*—Philip J. Sobukta
(74) *Attorney, Agent, or Firm*—Burns Doane Swecker and Mathis LLP

(57) ABSTRACT

The present invention is directed to an apparatus and method for varying the power level of a transmitted signal, such as a transmitted radio frequency signal, of high power, high transmission rate systems in a relatively straightforward, cost efficient manner. Exemplary embodiments can provide a range of stable DC control voltages for driving a power level attenuator, wherein the control voltages possess essentially no AC component (e.g., in exemplary embodiments, at a 5 volt DC output, virtually no AC component in the millivolt range is present), and possess a high current capability (e.g., at a 5 volt DC output exemplary embodiments can accommodate currents in excess of 0.5 amps (A) up to 7 A or greater). The ability to provide very stable, high current capability transmission power attenuation is especially desirable for communication systems, and in particular, wireless communication systems wherein conservation of energy is important, and wherein transmission rates are on the order of 125 Mb/s or higher, and transmission power is on the order of 0.5 to 2 watts (W) or higher. Because of its high current capability, power level attenuation of a transmitted signal in accordance with exemplary embodiments of the present invention is suitable for use in conjunction with high power (e.g., 0.5 W) monolithic millimeter wave integrated circuits (MMICs).

19 Claims, 4 Drawing Sheets

FROM FIG. 1B
TO FIG. 1D

RF INPUT
MMIC ATTEN.
MMIC ATTEN.
112
V2
T1
154
DC_OUT
T2
156
V1
T3
158
DC_IN
T4
160
XX L1 XX
VALUE
C25
C26
XX L2 XX
VALUE
C27
C28
XX L3 XX
VALUE
C29
C30
XX L4 XX
VALUE
C31
C32
1
2
119
RF OUTPUT

METHOD AND APPARATUS FOR VARYING THE POWER LEVEL OF A TRANSMITTED SIGNAL

RELATED APPLICATIONS

The present application is a continuation-in-part of U.S. application Ser. No. 09/185,579, filed Nov. 4, 1998 and entitled: METHOD AND APPARATUS FOR HIGH FREQUENCY WIRELESS COMMUNICATION, and now U.S. Pat. No. 6,442,374, the the disclosure of which is hereby incorporated by reference in its entirety. In addition, the present application relates to U.S. application Ser. No. 09/227,832, filed on even date herewith, and entitled: METHOD AND APPARATUS FOR PROVIDING HIGH CURRENT POWER REGULATION, and now U.S. Pat. No. 6,259,237, relates to U.S. application Ser. No. 09/227,831, filed on even date herewith, and entitled: METHOD AND APPARATUS FOR GENERATING A COMMUNICATION BAND SIGNAL WITH REDUCED PHASE NOISE, and now U.S. Pat. No. 6,522,868, relates to U.S. application Ser. No. 09/227,835, (Attorney Docket No. 017750-408) filed on even date herewith, and entitled: METHOD AND APPARATUS FOR INTERFACING WITH AN ETHERNET ARCHITECTURE (now abandoned), and relates to U.S. application Ser. No. 09/227,834, (Attorney Docket No. 017750-409) filed on even date herewith, and entitled: METHOD AND APPARATUS FOR INTERFACING WITH AN ETHERNET ARCHITECTURE (now abandoned), the disclosures of which are hereby incorporated by reference in their entireties.

BACKGROUND OF THE INVENTION

1. Field of the Invention

The present invention relates generally to communication systems and methods, and more particularly, to reliably varying the power level of a transmitted signal, such as a transmitted radio frequency (RF) signal.

2. State of the Art

Communication systems which employ wireless transceivers are well known. However, as is the case with most electronic technologies today, there is an ever increasing demand to improve information transmission rates and range (that is, power output), while at the same time, reducing the influence of noise and improving the quality of transmission. In addition, there is always increasing demand to broaden the applicability of wireless communications to technologies still dependent on wired or fiber linked communication, such as mainframe-to-mainframe communications where high data rate and high power requirements have precluded the use of conventional wireless communications. To satisfy these competing concerns, a compromise is often reached whereby some sacrifice in transmission rate is accepted to enhance the integrity of the data transmitted. In addition, sacrifices in transmission range, and in transmitter options, such as an ability to vary the transmit power, are accepted to reduce the transceiver's circuit complexity and cost.

An ability to adjust the power level of a transmitter output signal is desirable in conjunction with applications such as communication systems, in particular, with wireless communication systems, wherein output power requirements can change based on conditions including, but not limited to, weather conditions and distances over which wireless communication is to be performed. For example, a sunny day does not require the same transmitter power output as a rainy day. Accordingly, it would be desirable to reduce power output of the transmitter on sunny days to save power and to avoid saturation of the receiver (which results in signal distortion). Similarly, a transmission over a shorter distance permits, or can require, power output of the transmitter to be reduced. Variable output voltage attentuators are not presently available which would be suitable for the high power requirements of systems which employ high power monolithic millimeter wave integrated circuits (MMICs). Available attentuators are noisy, and are unable to provide a stable DC output which can be varied in response to an attenuator drive circuit that includes components, such as digital to analog converters.

Accordingly, it would be desirable to provide an apparatus and method for varying the power level of a transmitter output signal using a cost effective, straightforward approach that can accommodate high power requirements (e.g., 0.5 to 2 watts (W), or higher), high transmission rate systems (e.g., having operating frequencies on the order of 18–40 gigahertz (GHZ) spectrums or wider, and actual transmission rates on the order of 100 to 125 megabits per second (125 Mb/s) or higher). It would also be desirable to provide variations of the transmission power level in incremental steps which permit fine adjustment of the transmitted signal power.

SUMMARY OF THE INVENTION

The present invention is directed to an apparatus and method for varying the power level of a transmitted signal, such as a transmitted radio frequency signal, of high power, high transmission rate systems, in a relatively straightforward, cost efficient manner. Exemplary embodiments can provide a range of stable DC control voltages for driving a power level attenuator, wherein the control voltages possess essentially no AC component (e.g., in exemplary embodiments, at a 5 volt DC output, virtually no AC component in the millivolt range is present), and possess a high current capability (e.g., at a 5 volt DC output exemplary embodiments can accommodate currents in excess of 0.5 amps (A) up to 7 A or greater). The ability to provide very stable, transmission power attenuation is especially desirable for communication systems, and in particular, wireless communication systems wherein conservation of energy is important, and wherein transmission rates are on the order of 125 Mb/s or higher, and transmission power is on the order of 0.5 to 2 watts (W) or higher. Because of its high current capability, a power level attenuation controller in accordance with exemplary embodiments of the present invention is suitable for use in conjunction with high power (e.g., 0.5 W) monolithic millimeter wave integrated circuits (MMICs).

Generally speaking, exemplary embodiments of the present invention are directed to an apparatus and method for varying the power of a signal, comprising: means for receiving a regulated input voltage; means for varying said regulated input voltage to provide at least one variable control voltage having a stable voltage over a range of outputs which includes approximately 5.0 volts and a current capability of at least 0.5 amps; and means, responsive to said variable control voltage, for varying a power level of a signal to be transmitted. An exemplary apparatus for attenuating the power level of a transmitted signal includes means for converting a digital input into an analog output voltage; and means for driving a monolithic millimeter wave integrated circuit attenuator with said variable control voltage.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Power supplies often include an on-board voltage regulator or regulators. In an exemplary embodiment of a communication system transmitter as described in the aforementioned copending application, three such voltage regulators are included: a first regulator for a data input means and a data processing means of the transmitter, a second regulator for the portion of the power output means used to establish output amplification channels, and a third regulator for recombining the signals from the power amplification channels into a single RF output. Of course, those skilled in the art will appreciate that a single regulator, or any number of regulators can be used to provide the power supplies to the various components of the circuits. In communication system applications such as this, a voltage output of the regulator which can be varied can be used to, for example, adjust a power level of a transmitted signal provided variations in the voltage output do not detract from stable, reliable transmitter operation.

Figure 1A:
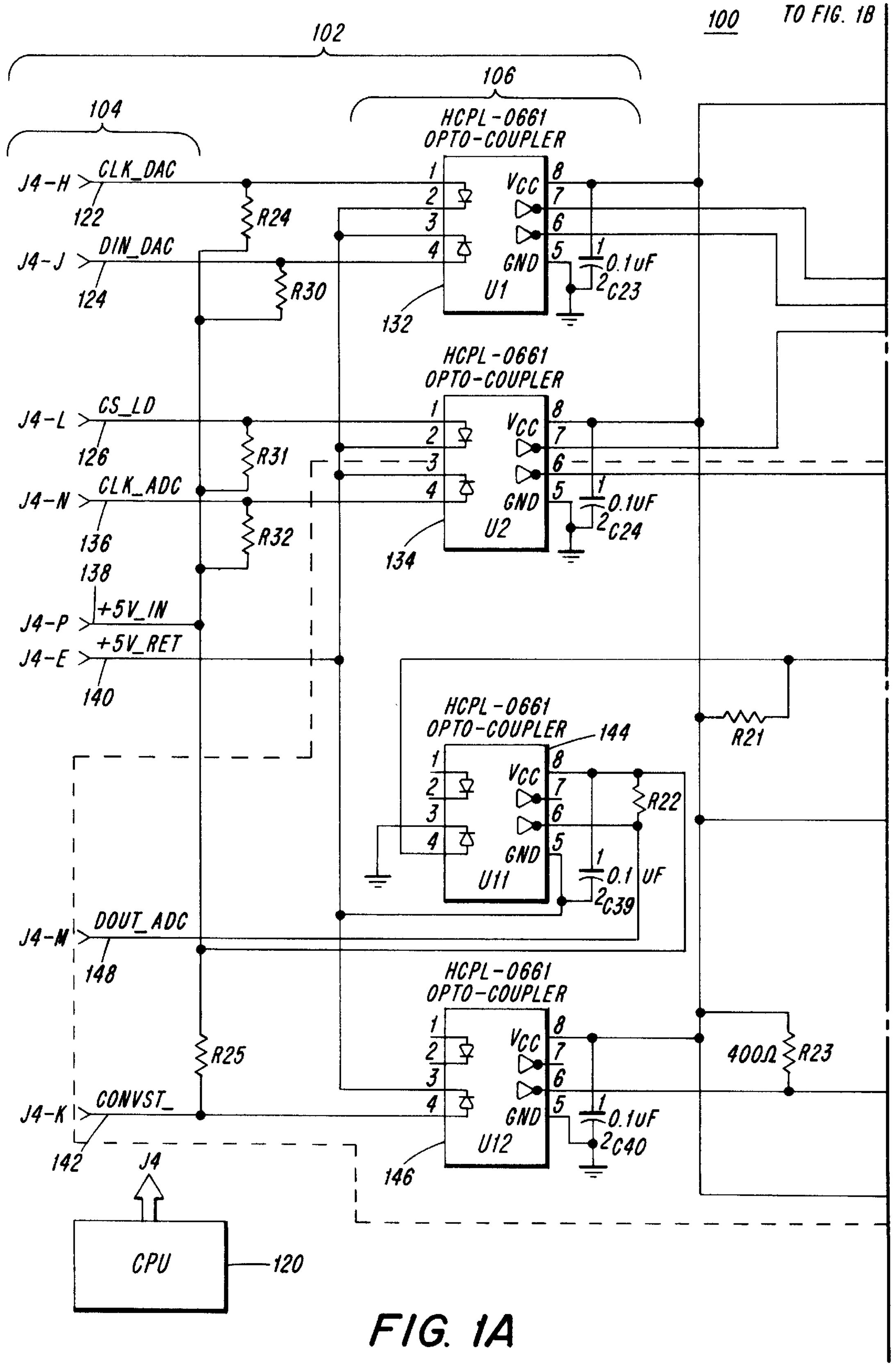
FIGS. 1A–1D show an exemplary block diagram of a power level attenuator in accordance with the present invention, which can be used, for example, to vary the power level of a transmitter output signal in a communication system.
Figure 1B:
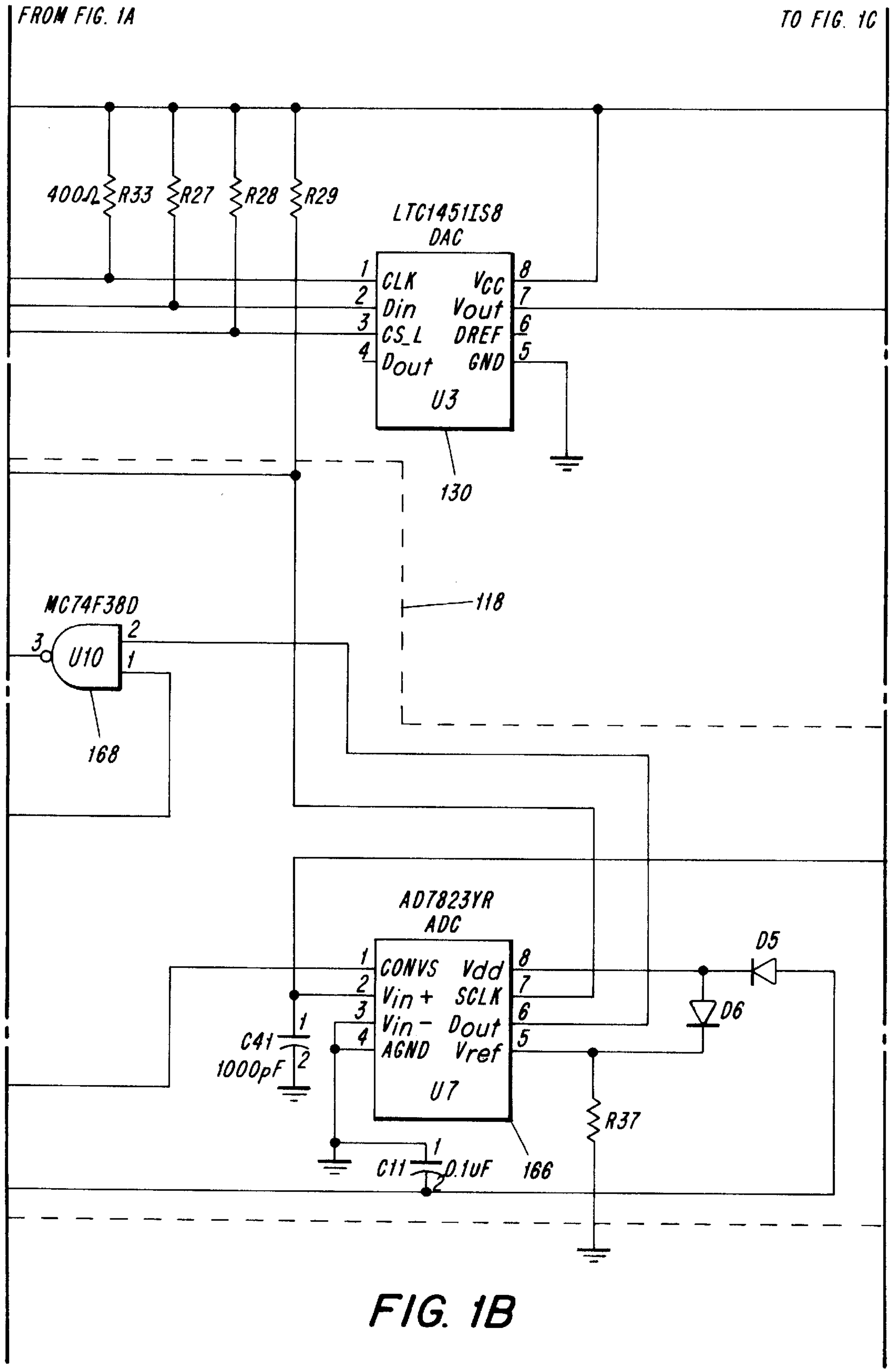
Figure 1C:
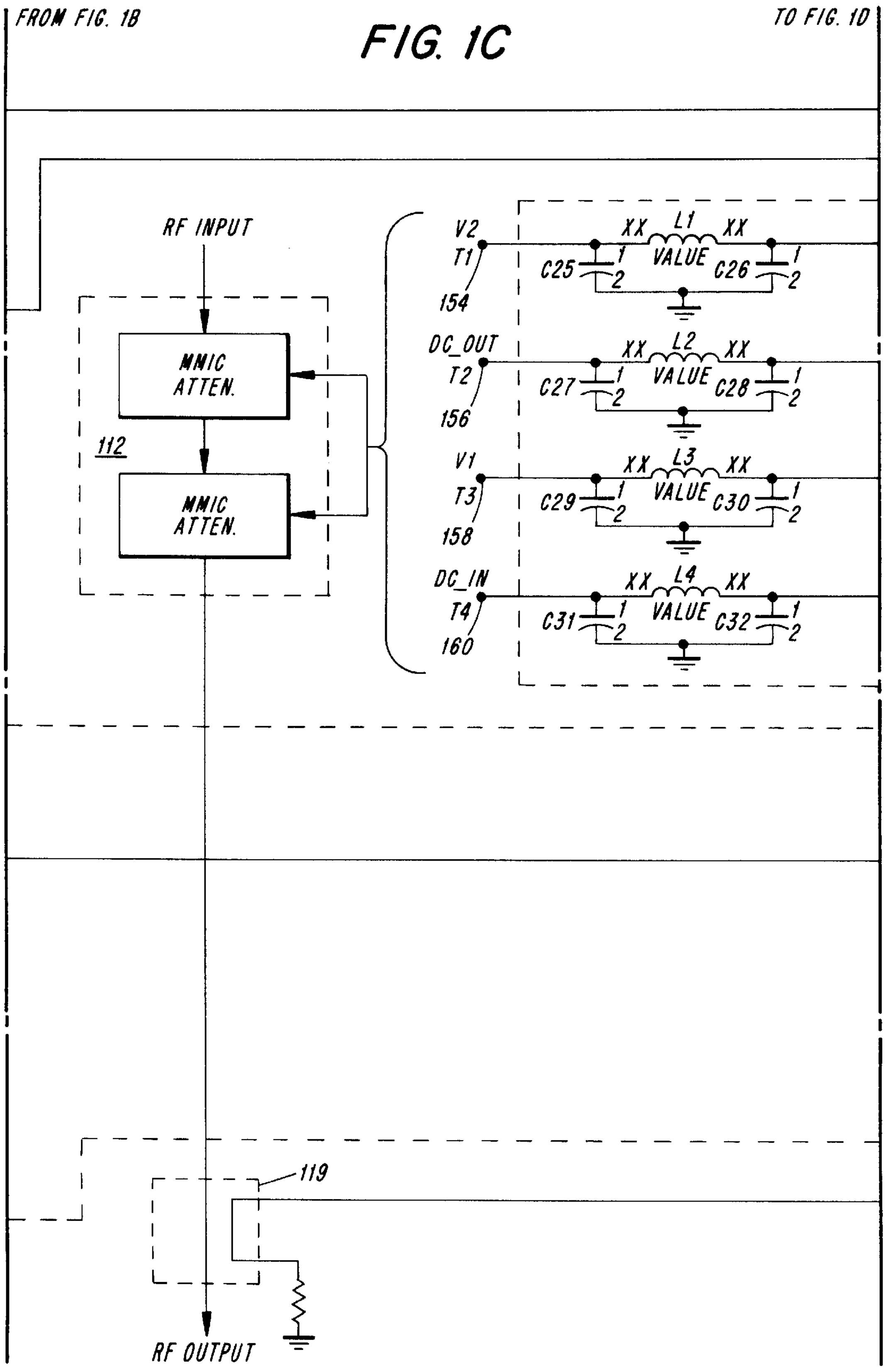
Figure 1D:
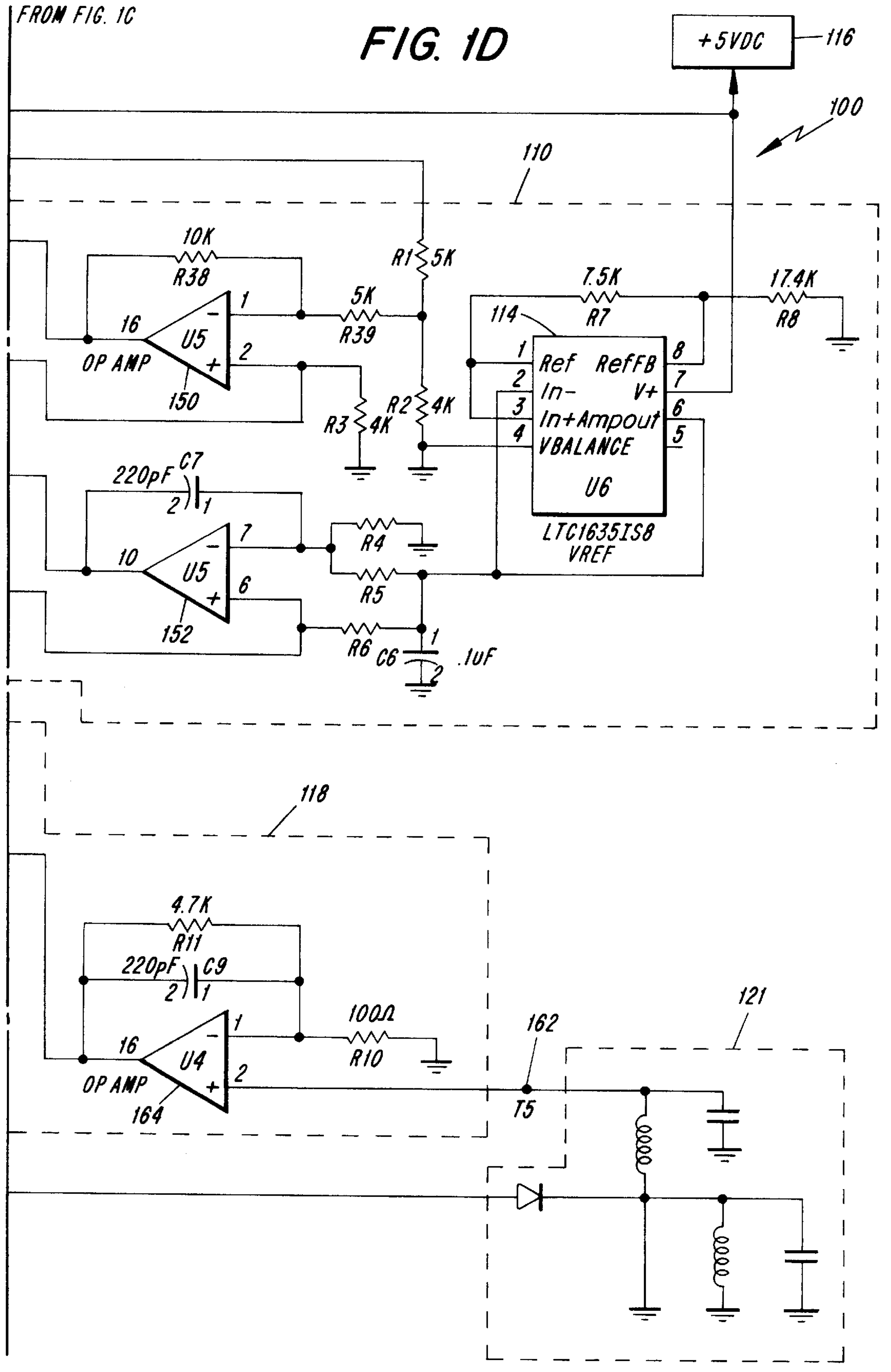

FIGS. 1A–1D illustrate an apparatus for varying the power level of a transmitted output signal in a cost effective, straightforward approach. The FIG. 1 apparatus is configured as a power level attenuation controller 100. The attenuation controller 100 includes a selection means 102 for receiving a digital output from, for example, a computer 120 used to control the power of a transmitted signal (e.g., a continuous wave RF signal). The selection means 102 includes input nodes 104 and an isolation means 106 for isolating downstream attenuation controller components from the relatively noisy environment of the computer's output.

The attenuation controller includes means for converting the output of the isolation means 106 from a digital signal to an analog signal using a digital-to-analog converter 130. The analog signal from the converting means is supplied as a variable magnitude DC voltage signal to an attenuator drive means 110, which drives a high power attenuator 112, such as two series connected millimeter monolithic integrated circuit (MMIC) attenuators. MMIC attenuators are available from manufacturers, such as Hewlett Packard (e.g., the HP MMIC HMMC-1002 attenuator) and others.

In exemplary embodiments of the present invention, an attenuator 112 is selected which can respond to control inputs to provide a step change in the power level of an RF input signal (such as an RF signal to be transmitted by a transmitter portion of transceivers configured in accordance with the copending application Ser. No. 09/185,579) over a desired range of interest. For purposes of the exemplary FIG. 1 embodiment, where an MMIC HMMC-1002 attenuator is selected, attenuation can be provided over an exemplary range from 0 to 60 decibels or greater, in steps on the order of 0.1 dB (or more, or less) for the frequencies specified herein. For example, each of the series connected attentuators can provide 30–45 dB of attenuation. Where a 38 GHZ RF input signal is supplied to these attentuators with a power of −10 dBm, and the attentuators provide 60 dB of attenuation, the power of the RF output will be reduced to −70 dBm. However, as mentioned previously, any desired range of attenuation and associated adjustable steps can be used in accordance with the specific application for which the attenuation controller is to be used.

The attenuation controller 100 can include an optional power level monitoring means 118 for detecting the transmission signal power and providing a display of the detected power at a monitor associated with the computer 120 used to select the output power. Generally speaking, the monitoring means 118 receives a power level input signal from a coupler 119 (e.g., inductive current sensor), via a filter 121, to detect the power level, and then supplies it to a display of the computer 120 via an amplifier, an analog-to-digital conversion means and an isolation means.

The components of the FIG. 1 attenuation controller 100 will now be described in further detail according to the exemplary embodiment illustrated. The input nodes 104 of the voltage selection means 102 are supplied by computer 120 and include a clock input 122, a data input 124 and a select (i.e., enable) input 126. The data input 124 from computer 120 specifies the desired output power level of the transmitter, and thus, the amount of attenuation which must be provided by attenuator 112. The three inputs 122, 124 and 126 are used to drive the digital-to-analog converter 130 via optocouplers 132 and 134 of the isolation means 106. The digital-to-analog converter can, for example, be any readily available D/A converter, including that available from Linear Technology Corporation and designated LTC1451IS8. The optocouplers can be those available from Hewlett Packard, and designated HCPL-0661.

The input nodes 104 further include a clock input 136 for driving the analog-to-digital converter of the monitoring means 118 via a portion of optocoupler 134. A voltage input and associated return of the attenuation controller 100 are received via nodes 138 and 140 (i.e., a voltage input isolated from the regulated voltage used to drive components on the attenuator side of the optocoupler), and are supplied to optocouplers 132 and 146.

An analog-to-digital converter enable signal is received via an input 142, and is supplied to the analog-to-digital converter of the voltage monitor means 118.

The voltage inputs and the analog-to-digital converter enable signal received on the nodes 138, 140 and 142 are supplied to the attenuation controller through optocoupler 134 and through additional optocouplers 144 and 146. An output from the monitoring means 118 is supplied back to the computer via a node 148 and optocoupler 144.

The optocouplers constitute an exemplary isolation means which can be used to avoid noisy signals of the computer from affecting the radio frequency circuitry located downstream of the attenuation controller. Although optocouplers are used, those skilled in the art will appreciate that any isolation means can be used which can receive the digital input signals from the selection means 102 and supply them to the attenuation controller in electrically isolated fashion. The selection supplied via the input nodes 104 passes through the digital-to-analog converter 130, and onto the drive means 110.

In an exemplary embodiment, a voltage reference generator 114 is provided for supplying a stable voltage (e.g., for a voltage of 5.0 V, no AC peak-to-peak ripple component, of greater than approximately one millivolt) from a regulated 5.0 volt DC voltage supply 116 (e.g., as produced in accordance with the aforementioned U.S. Pat.

No. 6,259,237) to components on the attenuator side of the optocouplers (e.g., the digital-to-analog converter and the components of the drive means 110). The output of the digital-to-analog converter thus constitutes a varied voltage from the regulated DC supply having a voltage selected in accordance with the inputs on input nodes 104. The exemplary drive means 110 includes operational amplifiers 150 and 152, configured as inverting op amps. The op amps supply four control voltages 154, 156, 158 and 160 for use by the high power attenuator to select the power level of the signal from the attenuator 112. In an exemplary embodiment, the four control voltages are a set of stable, variable DC voltages (as selected by input nodes 104) suitable for driving a Hewlett Packard HMMC-1002 MMIC attenuator in steps of 0.1 dB (or more, or less).

Although additional signal path components are shown in the exemplary FIG. 1 embodiment, the exact values shown for the elements identified (such as pull-up resistors R33, R27, R28, R29 and so forth) are not critical. Rather, the components shown, along with their respective values, are intended to be illustrative of an exemplary embodiment for implementing an attenuation controller in accordance with the present invention.

Having described an attenuation controller for varying the power of a signal, attention will now be directed to the monitoring means 118. In the exemplary FIG. 1 embodiment, the output power is received via a detection node 162 from a coupler which measures the power level of a signal being transmitted (e.g., an RF signal, or any other signal coupled to coupler 119). The detected DC voltage is supplied via a non-inverting operational amplifier 164 to an analog-to-digital converter 166, such as that available from Analog Devices, Inc., and designated AD7823YR. An output from the analog-to-digital converter, representing a digital version of the power level, is supplied through optocoupler 144 to the computer via node 148. The computer can then optionally display the transmitter power in any format desired. In an exemplary embodiment, the output from the analog-to-digital converter 166 is supplied to the optocoupler 144 via a driver 168 (e.g., a NAND gate) for providing sufficient current to drive the optocoupler (when an optocoupler is used for isolation).

The FIG. 1 block diagram can be used, for example, with a transmitter configured to transmit information, such as data, at actual information rates on the order of 100 to 125 Mb/s, or lower or higher. Those skilled in the art will appreciate that this actual transmission rate must account for overhead, such as conventional error correction, clock synchronization signals, and so forth. As such, the rate with which the data is transmitted will be somewhat lower (for example, 100 Mb/s). Although FIG. 1 illustrates a variable attenuation controller for use with a transmitter, those skilled in the art will appreciate that the attenuation controller can be configured as part of a transceiver which includes both a transmitter (such as that of FIG. 1) and a receiver, or with a receiver alone, or for use in any application where attenuation is desired.

The exemplary FIG. 1 embodiment is configured for use with a transmitter that can produce a power output on the order of 0.5 to 2 W using four parallel 0.5 W channels. For example, high power (e.g., 0.5 W) monolithic millimeter wave integrated circuits (MMICs), previously used in radar technology, can be used in the transmitter and receiver portions of a transceiver according to exemplary embodiments of the present invention to achieve full duplex, high power wireless communications with a simple circuit design. The high power outputs and fast information transmit/receive rates enable the use of wireless communications for broadband networking technologies and interconnectivity medium standards such as the synchronous digital hierarchy (SDH) known as the synchronous optical network SONET/SDH (e.g., SONET ring architectures having self-healing ring capability). Using available MMICs, such as high quality, low noise MMIC amplifiers, a five decibel (dB) noise figure or lower can be realized in a receiver portion. A transmitter configured using one or more MMICs can be used in conjunction with a receiver of the transceiver to provide point-to-point full duplex operation at operating frequencies in a fixed wireless spectrum range of 18–40 GHz (e.g., on the order of, for example, 20 GHz to 40 GHz) or wider, in contiguous 50 megahertz (MHZ) segments (or any other specified operating frequency range), over a range of the order of 2 kilometers (km) with, for example, 40 dB range attentuation or higher. Such transmitters are suitable for a variety of applications including, but not limited to, point-to-point wireless communications between computers, such as between personal computers, between computer networks and between mainframe computers over broadband networks with high reliability.

Although a plurality of separate integrated circuits are available to implement the various functions of the FIG. 1 embodiment, those skilled in the art will appreciate that all of the functions can be configured onto a single substrate to further enhance compactness using a monolithic device.

Although exemplary embodiments of the present invention have been described in the context of communication systems which use transmitters and receivers, those skilled in the art will appreciate that the invention is not so limited. Rather, exemplary embodiments of the present invention can be used whenever a power level control is desired. The applicability of the exemplary embodiments will, of course, be suitable for those applications where high current demands exist. Exemplary embodiments can thus be used in conjunction with any computer or computer applications.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Apparatus for varying power of signal, comprising:

means for receiving a regulated input voltage to output a stable voltage component;

means for varying said regulated input voltage to provide at least one variable control voltage having a stable voltage over a range of outputs which includes approximately 5.0 volts; and means, responsive to said variable control voltage and said stable voltage component, for varying power of a signal to be transmitted.

2. Apparatus according to claim 1, wherein said stable voltage component possesses no AC peak-to-peak components of greater than approximately 1 millivolt.

3. Apparatus according to claim 1, further comprising:

a monolithic millimeter wave integrated circuit attenuator as said power varying means.

4. Apparatus according to claim 1, further comprising:

a selection means for selecting a desired output power; and isolation means for isolating said selection means from said regulated input voltage varying means.

5. Apparatus according to claim 4, wherein said isolation means includes at least one optocoupler.

6. Apparatus according to claim 4, further comprising:

means for monitoring said signal power.

7. Apparatus according to claim 4, further comprising:

at least one digital-to-analog converter for converting an output from said selection means into an analog signal for driving said power varying means.

8. Apparatus according to claim 7, further comprising:

a monolithic millimeter wave integrated circuit voltage attenuator as said power varying means.

9. Apparatus according to claim 8, further comprising:

means for driving said attenuator using at least one op amp.

10. Apparatus according to claim 4, wherein said regulated input voltage varying means varies said at least one variable control voltage to vary output power in steps on the order of 0.1 dB over a range on the order of 0 to 60 dB.

11. Method for varying power of a signal, comprising the steps of:

receiving a regulated input voltage to output a stable voltage component;

varying said regulated input voltage to provide at least one variable control voltage having a stable voltage over a range of outputs which includes approximately 5.0 volts; and varying power of a signal to be transmitted in response to said variable control voltage and said stable voltage component.

12. Method according to claim 11, wherein said stable voltage component possesses no AC peak-to-peak components of greater than approximately 1 millivolt.

13. Method according to claim 11, further comprising the step of:

varying said power using a monolithic millimeter wave integrated circuit attenuator.

14. Method according to claim 13, further comprising the step of:

driving said attenuator using at least one op amp.

15. An apparatus for varying power of signal, comprising:

a first means for receiving a regulated input voltage to output a stable voltage component;

a second means for varying said regulated input voltage to output a variable voltage; and a third means, responsive to said variable voltage and said stable voltage component, for attenuating a signal.

16. The apparatus of claim 15, wherein the third means includes a monolithic millimeter wave integrated circuit.

17. The apparatus of claim 16, wherein the third means includes an inductor.

18. The apparatus of claim 16, wherein the third means includes an operational amplifier.

19. The apparatus of claim 18, wherein the third means includes an inductor connected to an output of the operational amplifier.

* * * * *